United States Patent
Corn et al.

(10) Patent No.: US 8,566,834 B2
(45) Date of Patent: Oct. 22, 2013

(54) MECHANISM FOR APPLICATION MANAGEMENT DURING SERVER POWER CHANGES

(75) Inventors: Vance Corn, Austin, TX (US); Scott A. Lenharth, Austin, TX (US); Madhav Karri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1311 days.

(21) Appl. No.: 12/244,370

(22) Filed: Oct. 2, 2008

(65) Prior Publication Data

US 2010/0088707 A1    Apr. 8, 2010

(51) Int. Cl.
     *G06F 9/50*    (2006.01)
(52) U.S. Cl.
     USPC .......................................................... 718/104
(58) Field of Classification Search
     None
     See application file for complete search history.

(56) References Cited

U.S. PATENT DOCUMENTS

| | | | |
|---|---|---|---|
| 6,564,325 B1 * | 5/2003 | Travostino et al. | 726/21 |
| 7,051,215 B2 | 5/2006 | Zimmer et al. | 713/300 |
| 7,188,264 B2 | 3/2007 | Morisawa | 713/300 |
| 7,213,065 B2 | 5/2007 | Watt | 709/223 |
| 2003/0233391 A1 * | 12/2003 | Crawford et al. | 709/104 |
| 2004/0268166 A1 * | 12/2004 | Farkas et al. | 713/320 |
| 2006/0224740 A1 * | 10/2006 | Sievers-Tostes et al. | 709/226 |
| 2007/0234090 A1 * | 10/2007 | Merkin et al. | 713/320 |
| 2007/0234091 A1 * | 10/2007 | Vishin et al. | 713/322 |
| 2007/0240006 A1 | 10/2007 | Fung | 713/323 |
| 2008/0065919 A1 | 3/2008 | Hatasaki et al. | 713/324 |
| 2008/0091978 A1 * | 4/2008 | Brodsky et al. | 714/38 |
| 2008/0104430 A1 * | 5/2008 | Malone et al. | 713/300 |
| 2008/0250415 A1 * | 10/2008 | Illikkal et al. | 718/103 |
| 2009/0016220 A1 * | 1/2009 | Uysal et al. | 370/232 |

OTHER PUBLICATIONS

Advanced Configuration and Power Interface Specification, Revision 3.0a, 38 pages, Dec. 30, 2005.

* cited by examiner

*Primary Examiner* — Jacob A Petranek
(74) *Attorney, Agent, or Firm* — Baker Botts L.L.P.

(57) ABSTRACT

The present disclosure provides, in some embodiments, a method for managing applications and resources. According to some embodiments, a power orchestrator may comprise (a) receiving information handling system resource status, (b) receiving one or more application registrations from one or more applications to be executed on the information handling system, (c) formulating a resource priority schedule using the received resource status and the one or more application registrations, (d) formulating a resource allocation schedule in accordance with the resource priority schedule, (e) communicating the resource allocation schedule to the one or more applications, and (f) allocating one or more resources to the one or more applications in accordance with the resource allocation schedule. A method may comprise, according to some embodiments, determining whether one or more of the one or more applications will submit a registration update and/or determining whether available resource(s) match demand and adjusting resource status to match demand.

20 Claims, 2 Drawing Sheets

MECHANISM FOR APPLICATION MANAGEMENT DURING SERVER POWER CHANGES

TECHNICAL FIELD

The present disclosure relates in general to power management for information handling systems, and more particularly to application management during server power changes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Power consumption and heat generation during power consumption may have a significant impact on both the operating cost and performance of information handling systems. Power consumption may also impact the availability and/or convenience of information handling systems. For example, the rate of power consumption may determine how quickly a battery-powered information handling system (e.g., mobile device and/or laptop) becomes depleted. Also, it may be desirable to limit power consumption in a desktop to reduce the noise generated by cooling fan(s). Reductions in power consumption may also have a desirable impact (e.g., less adverse impact) on the environment.

Accordingly, an information handling system (e.g., a server) may be configured with a power profile that sets suggested power usage levels and allows reporting of power used. However, significant operating system (OS) applications (e.g., database. web servers, and/or mail servers) may not be able to determine and/or tune themselves to the power usage settings of the hardware. Consequently, errors or failures may occur during power ramp-down periods.

SUMMARY

Therefore, a need has arisen for improved power management mechanisms. The present disclosure relates, in some embodiments, to systems, devices, applications, and/or methods for managing resources (e.g., power) and/or allocating resources (e.g., power) in accordance with a prioritization schedule. In accordance with the teachings of the present disclosure, the disadvantages and problems associated with power changes on application performance in an information handling system have been substantially reduced or eliminated.

The present disclosure provides, in some embodiments, a power orchestrator for managing applications and resources. According to some embodiments, a power orchestrator may comprise a power orchestrator configured to (a) receive information handling system resource status, (b) receive one or more application registrations from one or more applications to be executed on the information handling system, (c) formulate a resource priority schedule using the received resource status and the one or more application registrations, (d) formulate a resource allocation schedule in accordance with the resource priority schedule, (e) communicate the resource allocation schedule to the one or more applications, and (f) allocate one or more resources to the one or more applications in accordance with the resource allocation schedule. In some embodiments, information handling system resource status may comprise power and/or performance data for the information handling system and/or components thereof (e.g., BIOS configuration data). Information handling system resource status may comprise, according to some embodiments, power and/or performance data for one or more network-accessible components. Data may include data related to resource availability (e.g., fraction in use, fraction available for use, total resource present, total resource accessible locally and remotely). A power orchestrator may be further configured to (a) determine whether any of the one or more applications will submit an application registration update (e.g., and receive any updates), (b) determine whether resource availability matches resource demand; and/or adjust resource status to match resource demand. Matching resources to demand may include, for example, ramping down resource availability to match resource demand and/or ramping up resource availability to match resource demand.

The present disclosure provides, in some embodiments, a system for managing applications and resources. According to some embodiments, a management system may comprise (a) a processor, (b) a memory communicatively coupled to the processor and comprising a basic input/output system (BIOS), (c) one or more applications configured to be executed, at least in part, by the processor, (d) a power supply coupled to the processor, and (e) a power orchestrator. In some embodiments, a power orchestrator may be configured to (a) receive information handling system resource status (e.g., power status), (b) receive one or more application registrations from one or more applications to be executed on the information handling system, (c) formulate a resource priority schedule using the received resource status and the one or more application registrations, (d) formulate a resource allocation schedule in accordance with the resource priority schedule, (d) communicate the resource allocation schedule to the one or more applications, and/or (e) allocate one or more resources to the one or more applications in accordance with the resource allocation schedule. In some embodiments, an information handling system may comprise a local storage communicatively coupled to the processor and the power orchestrator, for example, a local storage comprising BIOS configuration data and application registration data. An information handling system may comprise, according to some embodiments, a network interface communicatively coupled to the processor and/or a display (and/or other input/output devices) communicatively coupled to the processor.

The present disclosure provides, in some embodiments, a method for managing applications and resources. According to some embodiments, a power orchestrator may comprise (a) receiving information handling system resource status, (b)

receiving one or more application registrations from one or more applications to be executed on the information handling system, (c) formulating a resource priority schedule using the received resource status and the one or more application registrations, (d) formulating a resource allocation schedule in accordance with the resource priority schedule, (e) communicating the resource allocation schedule to the one or more applications, and (f) allocating one or more resources to the one or more applications in accordance with the resource allocation schedule. A method may comprise, according to some embodiments, determining whether one or more of the one or more applications will submit a registration update and/or determining whether available resource(s) match demand and adjusting resource status to match demand.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
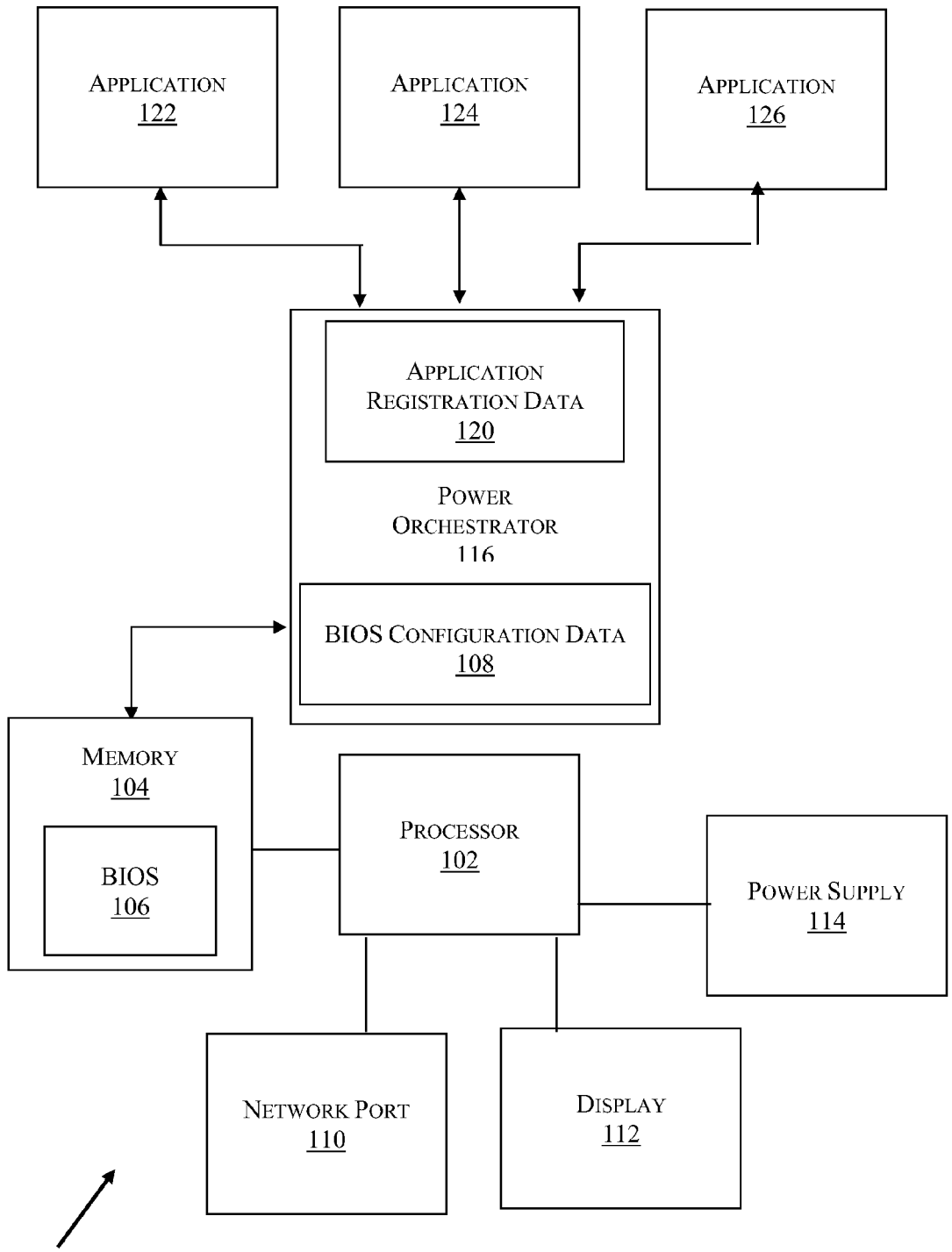
FIG. 1 illustrates a block diagram of an example system for power management of one or more information handling systems, in accordance with the present disclosure.
Figure 2:
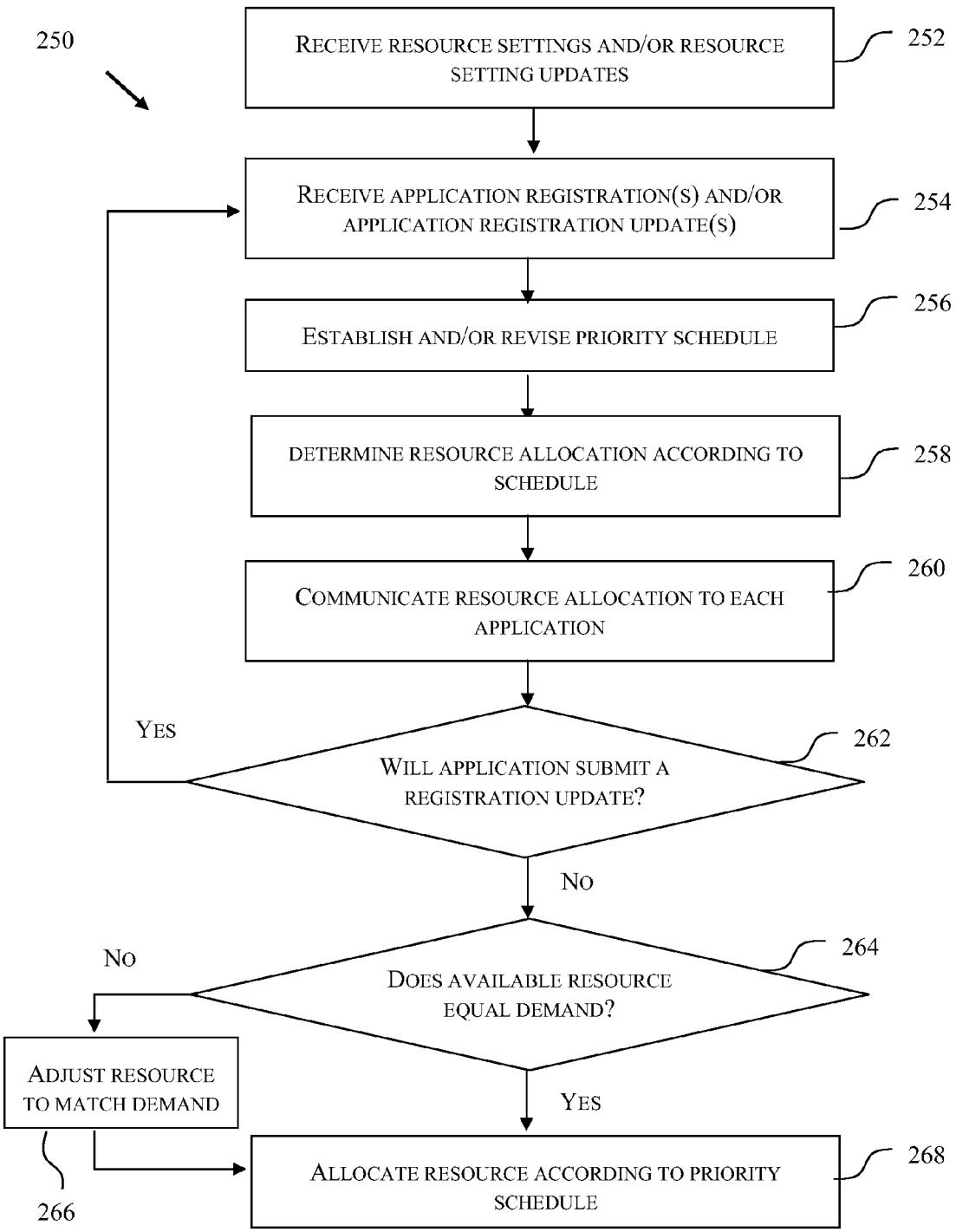
FIG. 2 illustrates a flow chart of an example method for power management of one or more information handling systems, in accordance with the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

In some information handling systems, a basic integrated system (BIOS) may be used to ensure that all components are functional. Particularly, the BIOS may be responsible for establishing the association between device components (e.g., disk drives, video controllers, keyboard, mouse, etc.) and the operating system executed by the information handling system. The BIOS may also include data and instructions that enable the operating system to access the information handling system hardware. The system BIOS is stored in the information handling system's memory, typically in non-volatile memory such as flash memory, for example. During booting, the system BIOS first performs a Power On Self Test (POST), and then proceeds to load the operating system. Following successful loading of the operating system, the user will be able to take advantage of all features and functionality offered by or through the operating system.

Applications may be impacted (e.g., adversely impacted) as an information handling system (e.g., a server, desktop, laptop or other) moves between power states (e.g., Advanced Configuration and Power Interface (ACPI) states). For example, an information handling system moving to a lower power state may indiscriminately reduce power and/or other resources to all applications (e.g., all applications reduced at the same rate). The present disclosure relates, in some embodiments, to a power orchestrator (e.g., an operating system-embedded power orchestrator) configured to manage resource allocation to applications. A power orchestrator receives (e.g., extracts) hardware profile settings (e.g., resource availability from BIOS) and receives registrations from power-aware ("green") applications. For example, applications, upon registration, may communicate the circumstances, if any, under which they may be ramped up or ramped down. Applications that may be ramped up and/or down may further indicate steps to be taken including, for example, increasing or decreasing threads, altering memory allocations, renegotiating timeouts in protocol transactions, and/or expanding or limiting the amount of remote requests accepted. According to some embodiments, an information handling system (e.g., a power orchestrator) may include a preset registration profile and/or prioritization schedule for applications that are power-blind (i.e., not power aware).

FIG. 1 illustrates an example information handling system 100 having a system for orchestrating power needs and usage, in accordance with embodiments of the present disclosure. As shown in FIG. 1, information handling system 100 may include a processor 102, memory 104, a BIOS 106, BIOS configuration data 108, a network port 110, a display 112, power supply 114, a power orchestrator 116, application registration data 120, and applications 122, 124, and 126.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of information handling system 100 and may output results, graphical user interfaces (GUIs), websites, and the like over network port 110 or via display 112.

Memory 104 may be coupled to processor 102 and may comprise any system, device, or apparatus operable to retain program instructions or data for a period of time. Memory 104 may be random access memory (RAM), electrically erasable programmable read-only memory (EEPROM), a PCM-CIA card, flash memory, or any suitable selection and/or array of volatile or non-volatile memory that retains data after power to information handling system 100 is turned off. For example, memory 104 may store a basic integrated operating system (BIOS) 106, generally referred to as a basic input/output system, which may include a firmware configured to identify and/or initiate hardware components (e.g., hard drives, floppy drive, disk drives, keyboards, mouse, and other integrated or peripheral components coupled to information handling system 100).

BIOS configuration data 108 may include power data and/or performance data for one or more system components (e.g., processor 102, memory 104, power supply 114) and/or one or more network-accessible components (e.g., through network port 110). BIOS configuration data 108 may include settings and/or setting changes from an administrator.

Network port 110 may be any suitable system, apparatus, or device operable to serve as an interface between information handling system 100 and a network. Network port 110 may enable information handling system 100 to communicate over a network using any suitable transmission protocol and/or standard, including without limitation all transmission protocols and/or standards known in the art.

Display 112 may comprise any display device suitable for creating graphic images and/or alphanumeric characters recognizable to a user, and may include, for example, a liquid crystal display (LCD) or a cathode ray tube (CRT).

Power supply 114 may include any device, system, or apparatus operable to supply power or electrical energy to one or more components of information handling system 100. For example, power supply 114 may include any system, device, and/or apparatus operable to supply direct current (DC) electrical power to one or more components of information handling system 100. In some embodiments, DC power supply 114 may include a battery and/or an AC/DC adapter that may convert 120- or 240-volt (or any other suitable voltage) alternating current supplied by a utility company to a regulated lower voltage DC power supply. In addition, an AC/DC adapter may also charge a battery while supplying power to information handling system 100.

Power orchestrator 116 may be communicatively coupled to processor 102, memory 104, storage 118, and applications 122, 124, and 126. Optionally, power orchestrator 116 may be connected to power supply 114. Power orchestrator 116 may be embodied in machine-readable code embedded in an operating system and/or a virtualization platform (e.g., software, kernel, firmware). Power orchestrator 116 may be the exclusive resource manager in an information handling system.

In operation, power orchestrator 116 manages power consumption in accordance with resource settings (e.g., power settings in BIOS configuration data 108) and application registration data 120. For example, power orchestrator 116 reads BIOS configuration data 108, reads application registration data 120, establishes a priority schedule for available resources (e.g., power), determines power allocation according to the priority schedule, informs each application of power status (e.g., impact of power status on each application), and allocates resources according to the priority schedule. Allocating resources may include ramping power down, ramping bus speed down, ramping power up, ramping bus speed up, ending one or more applications, putting one or more applications to sleep, increasing or decreasing threads, altering memory allocations, renegotiating timeouts in protocol transactions, limiting the amount of remote requests accepted, and/or combinations thereof. In some embodiments, one or more of the foregoing actions may be delegated to the applications themselves.

Application registration data 120 may comprise data for each application including an application priority setting and/or whether the application may be powered down or up. This may include steps to be taken to adjust power consumption by the application, for example, increasing or decreasing threads, altering memory allocations, renegotiating timeouts in protocol transactions, and/or limiting the amount of remote requests accepted.

Application 122 may be a power-aware, high-priority application (e.g., a web server, an email server, a database). As a power-aware application, application 120 may initiate registration (e.g., upon launch) with power orchestrator 116 and/or may register in response to a power orchestrator 116 request. Application 122 may also include contingent operating instructions for execution during reduced power. For example, if power is ramped down, application 122 may use bandwidth throttling to reduce performance requirements, reduce worker threads, and/or reduce cache size.

Application 124 may be a power-aware, low-priority application (e.g., an anti-virus application). As a power-aware application, application 122 may initiate registration (e.g., upon launch) with power orchestrator 116 and/or may register in response to power orchestrator 116 request. Application 124 may also include contingent operating instructions for execution during reduced power. For example, if power is ramped down, application 124 may use bandwidth throttling to reduce performance requirements, reduce worker threads, and/or reduce cache size.

Application 126 may be a power-blind application lacking ability to register with power orchestrator 116, and/or without contingent operating instructions for execution during reduced power. Power orchestrator 116 may assign power-blind applications (e.g., application 126) priority and/or power settings. This assignment may be arbitrary, based on administrator (or other) input, based on a set of predetermined instructions, and/or based on an assessment of the application type, in some embodiments. Where application 126 has a limited ability or no ability to ramp down its resource requirements, power orchestrator 116 may restrict resource access and/or terminate execution. As a power-blind application, application 126 may not be capable of communicating directly with power orchestrator 116. Therefore, the communication between power orchestrator 116 and application 126 illustrated in FIG. 1 may be indirect. For example, power orchestrator 116 may gather information about application 126 from processor 102, memory 104 or other sources.

FIG. 2 illustrates a flow chart of an example method 250 for power management of an information handling system (e.g., information handling system 100), in accordance with the present disclosure. In one embodiment, method 250 includes receiving resource settings and/or resource setting updates 252, receiving application registration(s) and/or application registration update(s) 254, establishing and/or revising a priority schedule 256, determining resource allocation according to the priority schedule 258, communicating resource allocation to each application 260, and allocating resource(s) according to the priority schedule 268. Method 250 may further include determining whether an application will submit a registration update 262, determining whether available resource(s) match demand 264, and/or adjusting resource availability to match demand 266.

According to one embodiment, method 250 may begin at step 252. As noted above, teachings of the present disclosure may be implemented in a variety of configurations of system 100. As such, the preferred initialization point for method 250 and the order of the steps 252-268 comprising method 250 may depend on the implementation chosen.

At step 252, power orchestrator 116 receives power settings and/or power setting updates. For example, power orchestrator 116 may receive (e.g., accept, retrieve, accesses) power settings/updates from BIOS 106 and/or BIOS configuration data 108. Power orchestrator 116 may receive power settings/updates through direct communication with power supply 114. Power orchestrator 116 may receive power settings/updates continuously, periodically, on demand, and/or upon the occurrence of an event (e.g., boot, change in resource availability).

At step 254, power orchestrator 116 receives application registrations and/or application registration updates. For example, power orchestrator 116 may receive (e.g., accept, retrieve, accesses) application registrations/updates from application registration data 120 and/or each of applications 122 and/or 124. Application registrations may include priority setting(s) (e.g., absolute, conditional, and/or relative priority setting(s)), wake on power setting(s), wake on admin action setting(s), sleep setting(s), restart setting(s), and/or execution instructions for various power states. For example, application registrations may include first choice access request(s) when resource availability is not limited, second choice access request(s) when resource availability is limited, but not foreclosed, and/or third choice access request(s) when resource is unavailable. Power orchestrator 116 may receive registrations/updates continuously, periodically, on demand, and/or upon the occurrence of an event (e.g., application launch, change in resource availability).

Power-blind application 126 may not be configured to register with power orchestrator 116 in the same way as power-aware applications 122 and 124. For example, application 126 may be registered manually (e.g., by an administrator) and/or automatically (e.g., by power orchestrator 116). In some embodiments, power orchestrator 116 may receive information about application 126 (e.g., application type, run state, resources utilized) from processor 102, storage 118 (e.g., application registration data), and/or memory 104. Power orchestrator 116 may register application 126 based on information received and/or one or more rules (e.g., predetermined rule(s), pre-programmed rule(s)).

As a safeguard against runaway demands on resources, registrations may be treated as resource requests, according to some embodiments. For example, registering as a top priority application does not necessarily mean that power orchestrator 116 will grant top priority scheduling. For example, power orchestrator 116 (alone or in cooperation with other system components) may be configured to recognize malicious applications and deny outright resource allocation requests. Power orchestrator 116 (alone or in cooperation with other system components) may be configured to recognize registrations that are inaccurate (e.g., inadequate and/or excessive) and adjust registration information accordingly.

At step 256, power orchestrator 116 establishes and/or revises a priority schedule in accordance with the received power settings and application registrations. In some embodiments, this may include ranking applications as a whole and/or ranking applications with respect to each resource needed. Resources needed may include, for example, power, processor time and/or speed, memory time and/or speed, network access, time, and/or speed, and/or combinations thereof.

At step 258, power orchestrator 116 determines the resources to be allocated based on the priority schedule determined at step 256. This may include determining whether demand exceeds available resource(s), and, if so, producing a resource allocation schedule designating which applications will receive requested resources.

At step 260, power orchestrator 116 communicates resource availability and/or resource allocation to each application. This may include informing each application of the resources it has been allotted, if any. For example, this may include communicating a resource allocation schedule to each application.

According to some embodiments, steps 262, 264, and 266 may be independently optional. For example, method 250 may be practiced with step 262, but without steps 264 and 266.

At step 262, each application may be queried (e.g., by power orchestrator 116) to determine whether it will submit a registration update. An application may submit a registration update, in some embodiments, where circumstances have changed since its last registration and/or the resource allocation communicated is inadequate for or exceeds the resource allocation sought by the application. For example, as an application runs, its demand for resources may change. If the prior registration does not accurately represent the status of the application, it may be desirable to update the registration. An application may raise its priority or lower its priority to better match current needs. For example, if resources to be allocated are deemed insufficient, the application may seek to raise its priority and/or modify the steps to be taken to adapt to its resource allocation. On the other hand, if resources to be allocated are deemed to be more than sufficient for current needs, the application may lower its priority to free up resources for other applications and/or allow power orchestrator 116 to ramp down resource usage. If an application submits a registration update, power orchestrator 116 may receive that registration update via step 254 and resume method 250 from that point.

At step 264, for example, power orchestrator 116 may evaluate whether available resources match (e.g., equal) current requests/demands and, if not, adjust resource usage accordingly (step 266). For example, after all applications have had an opportunity to update their registrations (e.g., in embodiments where step 264 follows step 262), it may be determined that resources exceed existing demand. If so, step 266 may include ramping down resources (e.g., power) to match actual demand. On the other hand, after all applications have had an opportunity to update their registrations (e.g., in embodiments where step 264 follows step 262), it may be determined that demand exceeds existing resources. If so, step 266 may include recruiting additional resources, for example, by ramping up existing resources within system 100 and/or by accessing additional resources through network port 110.

At step 268, power orchestrator 116 allocates resources according to the priority schedule. Step 268 differs from step 258 in that step 268 comprises actually granting access to resources, granting continued access to resources (for ongoing applications), and/or changing access to resources.

According to some embodiments, method 250 may begin at step 252. As noted above, teachings of the present disclosure may be implemented in a variety of configurations of system 100. As such, the initialization point for method 250 and the order of the steps 252-268 comprising method 250 may depend on the implementation chosen. In addition, steps 252-268 may be repeated independently and/or collectively as often as desired or required.

Although FIG. 2 discloses a particular number of steps to be taken with respect to method 250, method 200 may be executed with greater or lesser steps than those depicted in FIG. 2. In addition, although FIG. 2 discloses a certain order of steps to be taken with respect to method 200, the steps comprising method 200 may be completed in any suitable order. For example, step 252 may occur before step 254, after step 254, and/or concurrently with step 254.

Method 250 may be implemented using system 100 or any other system operable to implement method 250. In certain embodiments, method 250 may be implemented partially or fully in software embodied in computer-readable media.

Using the methods and systems disclosed herein, problems associated with conventional approaches to power management in information handling systems may be improved, reduced, or eliminated. For example, the methods and systems disclosed herein provide a power orchestrator for managing power consumption, thus reducing power consumption, "starving" and possible failure of applications if a processor is ramped down by hardware due to a power policy threshold. It also allows lower-priority applications to stop themselves to allow higher-priority applications to continue to run with sufficient system resources.

Although the present disclosure has been described in detail, it should be understood that various changes, substitutions, and alterations can be made hereto without departing from the spirit and the scope of the disclosure as defined by the appended claims.

What is claimed is:

1. An apparatus for managing applications on an information handling system comprising:
   a power orchestrator configured to
      receive information handling system resource status,
      receive one or more application registrations from one or more applications to be executed on the information handling system,
      formulate a resource priority schedule by directly using the received resource status and the one or more application registrations,
      formulate a resource allocation schedule in accordance with the resource priority schedule,
      communicate the resource allocation schedule directly to the one or more applications, and
      allocate one or more resources to the one or more applications in accordance with the resource allocation schedule.

2. An apparatus according to claim 1, wherein the information handling system resource status comprises information handling system power status.

3. An apparatus according to claim 1, wherein the power orchestrator is configured to determine whether any of the one or more applications will submit an application registration update.

4. An apparatus according to claim 1, wherein the power orchestrator is configured to determine whether resource availability matches resource demand.

5. An apparatus according to claim 4, wherein the power orchestrator is configured to adjust resource status to match resource demand.

6. An apparatus according to claim 5, wherein the power orchestrator is configured to ramp down resource availability to match resource demand.

7. An apparatus according to claim 5, wherein the power orchestrator is configured to ramp up resource availability to match resource demand.

8. An information handling system comprising:
   a processor;
   a memory communicatively coupled to the processor and comprising a basic input/output system (BIOS);
   one or more applications configured to be executed, at least in part, by the processor;
   a power supply coupled to the processor; and
   a power orchestrator configured to:
      receive information handling system resource status,
      receive one or more application registrations from one or more applications to be executed on the information handling system,
      formulate a resource priority schedule by directly using the received resource status and the one or more application registrations,
      formulate a resource allocation schedule in accordance with the resource priority schedule,
      communicate the resource allocation schedule directly to the one or more applications, and
      allocate one or more resources to the one or more applications in accordance with the resource allocation schedule.

9. An information handling system according to claim 8 further comprising a local storage communicatively coupled to the processor and the power orchestrator, the local storage comprising BIOS configuration data and application registration data.

10. An information handling system according to claim 8 further comprising a network interface communicatively coupled to the processor.

11. An information handling system according to claim 8 further comprising a display communicatively coupled to the processor.

12. An information handling system according to claim 8, wherein the information handling system resource status comprises information handling system power status.

13. An information handling system according to claim 8, wherein the power orchestrator is configured to determine whether any of the one or more applications will submit an application registration update.

14. An information handling system according to claim 8, wherein the power orchestrator is configured to determine whether resource availability matches resource demand.

15. An information handling system according to claim 14, wherein the power orchestrator is configured to adjust resource status to match resource demand.

16. An information handling system according to claim 15, wherein the power orchestrator is configured to ramp down resource availability to match resource demand.

17. An information handling system according to claim 15, wherein the power orchestrator is configured to ramp up resource availability to match resource demand.

18. A method for managing information handling system resources, the method comprising:
- receiving information handling system resource status;
- receiving one or more application registrations from one or more applications to be executed on the information handling system,
- formulating a resource priority schedule by directly using the received resource status and the one or more application registrations;
- formulating a resource allocation schedule in accordance with the resource priority schedule;
- communicating the resource allocation schedule directly to the one or more applications; and
- allocating one or more resources to the one or more applications in accordance with the resource allocation schedule.

19. A method according to claim 18 further comprising determining whether one or more of the one or more applications will submit a registration update.

20. A method according to claim 18 further comprising determining whether available resource(s) match demand and adjusting resource status to match demand.

\* \* \* \* \*